United States Patent
Wysocki et al.

(10) Patent No.: US 11,025,745 B2
(45) Date of Patent: Jun. 1, 2021

(54) TECHNOLOGIES FOR END-TO-END QUALITY OF SERVICE DEADLINE-AWARE I/O SCHEDULING

(71) Applicant: Intel Corporation, Santa Clara, CA (US)

(72) Inventors: Piotr Wysocki, Gdansk (PL); Maciej Andrzej Koprowski, Gdansk (PL); Grzegorz Jereczek, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 69 days.

(21) Appl. No.: 16/021,827

(22) Filed: Jun. 28, 2018

(65) Prior Publication Data
US 2019/0045028 A1 Feb. 7, 2019

(51) Int. Cl.
| | | |
|---|---|---|
| H04L 29/08 | (2006.01) | |
| H04L 12/24 | (2006.01) | |
| H04L 12/26 | (2006.01) | |

(52) U.S. Cl.
CPC ........ *H04L 67/322* (2013.01); *H04L 41/5009* (2013.01); *H04L 41/5022* (2013.01); *H04L 43/0852* (2013.01); *H04L 67/325* (2013.01); *H04L 43/16* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 8,707,316 B1* | 4/2014 | Wang .................. | G06F 30/22 |
| | | | 718/103 |
| 2006/0248182 A1* | 11/2006 | Glassco ............... | H04L 67/322 |
| | | | 709/223 |
| 2011/0125921 A1* | 5/2011 | Karenos ............... | H04L 45/00 |
| | | | 709/240 |
| 2014/0185628 A1* | 7/2014 | Matthews ............ | H04L 47/6215 |
| | | | 370/412 |
| 2017/0171882 A1* | 6/2017 | Sundararajan ..... | H04W 72/1289 |
| 2018/0131614 A1* | 5/2018 | Song ..................... | H04L 43/0852 |
| 2018/0316557 A1* | 11/2018 | Frangieh ............. | H04L 47/28 |

(Continued)

OTHER PUBLICATIONS

Martinez et al. "Efficient Deadline-Based QoS Algorithms for High-Performance Networks", IEEE Transactions on Computers, vol. 57 No. 7, pp. 928-939, Jul. 2008 [retrieved on Jan. 3, 2020], Retrieved from the Internet: <URL: https://ieeexplore.ieee.org/stamp/stamp.jsp?tp=&arnumber=4459315>. (Year: 2008).*

(Continued)

*Primary Examiner* — Sm A Rahman
*Assistant Examiner* — Dae Kim
(74) *Attorney, Agent, or Firm* — Compass IP Law, PC (57) ABSTRACT

Technologies for end-to-end quality of service for I/O operations include a compute device in an I/O path. The compute device receives from another of the compute devices in the I/O path, an I/O request packet. The I/O request packet includes one or more QoS deadline metadata. The QoS deadline metadata is indicative of latency information relating to a currently executing workload relative to a specified QoS. The compute device evaluates the QoS deadline metadata and assigns a priority to the I/O request packet as a function of the evaluated metadata.

15 Claims, 8 Drawing Sheets

(56) References Cited

U.S. PATENT DOCUMENTS

2019/0129653 A1\* 5/2019 Yang .................... G06F 3/0659
2019/0335405 A1\* 10/2019 Wang .................... H04W 76/12

OTHER PUBLICATIONS

Haferkamp et al. "Payload-Size and Deadline-Aware Scheduling for Time-critical Cyber Physical Systems", Wireless Days, 2017 [retrieved on Jan. 3, 2020], Retrieved from the Internet: <URL: https://arxiv.org/pdf/1610.05936.pdf>. (Year: 2017).\*

\* cited by examiner

TECHNOLOGIES FOR END-TO-END QUALITY OF SERVICE DEADLINE-AWARE I/O SCHEDULING

BACKGROUND

Quality of service (QoS) generally pertains to a measurement of overall performance for a service. A service level agreement (SLA) between a provider (e.g., a cloud service provider) and a user may specify QoS requirements to be upheld by the provider while performing the service on behalf of the user. For example, the SLA may specify performance metrics such as I/O latency, network bandwidth, and availability to be upheld as part of QoS.

I/O latency is a QoS metric that is of growing importance. For example, given a distributed storage scheme, a user might desire storage I/O read requests to be handled at a relatively low latency according to an SLA, e.g., under 500 µs. However, many contributors factor into the overall latency of an I/O request, such as the latency of software layers of the requesting compute device, latency of intermediary network devices, latency caused by network cables, latency of software layers in a distributed storage device, latency of storage drives, and the like. In a current approach to ensure that the I/O latency meets QoS requirements, static prioritization of I/O requests is used. However, this approach is inefficient, as some requests may be over-prioritized in situations, thus challenging infrastructure more than necessarily.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
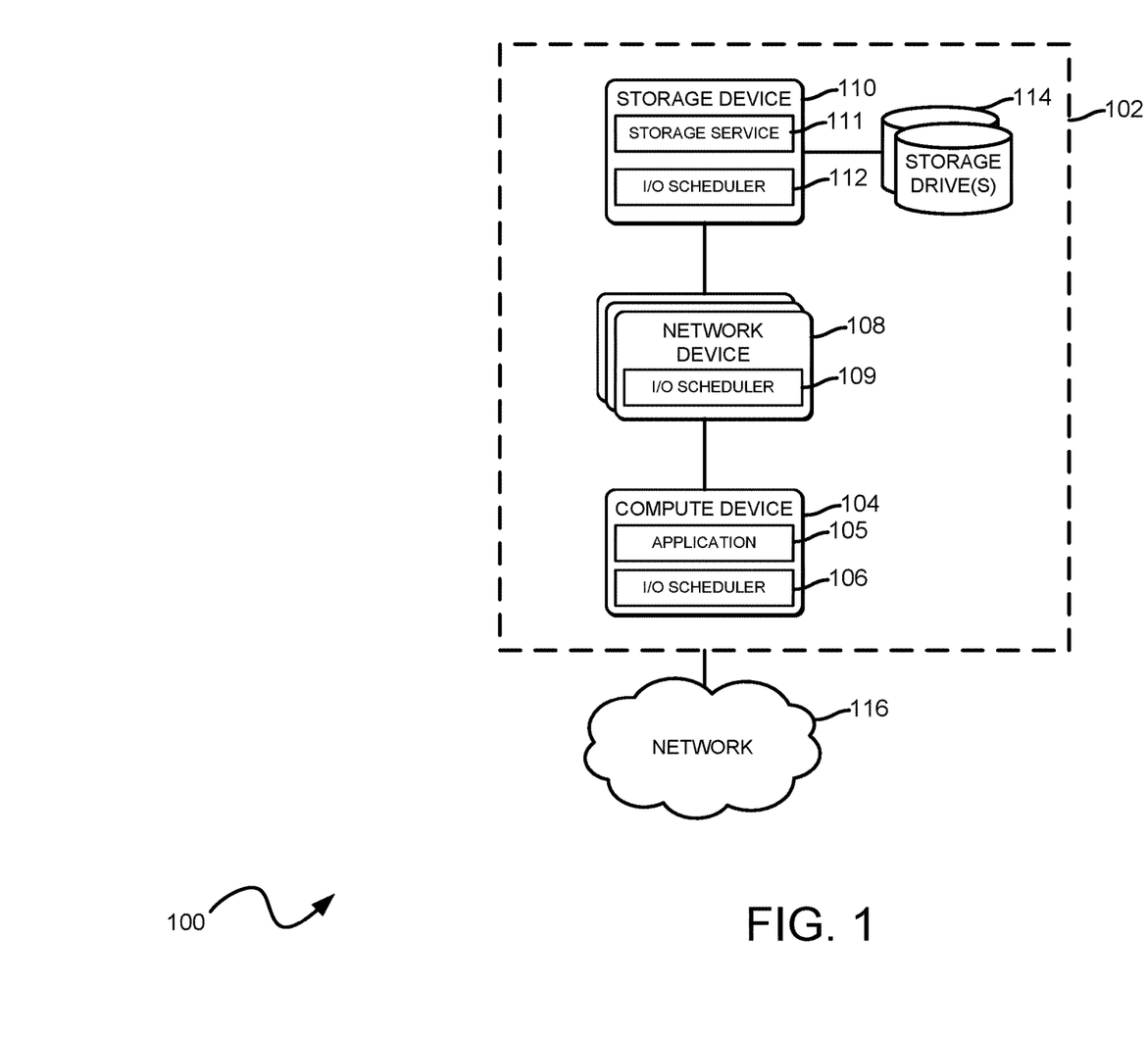
FIG. 1 is a simplified block diagram of an example computing environment in which I/O requests are prioritized using a quality of service (QoS) deadline-aware scheduler.

Referring now to FIG. 1, a computing environment 100 in which a quality of service (QoS) deadline-aware I/O scheduler may be adapted is shown. In some embodiments, the computing environment 100 is embodied as a cloud provider network 102, connected to a network 116 (e.g., the Internet). The cloud provider network 102 may include a compute device 104, one or more network devices 108, and a storage device 110. Each of the compute device 104 and storage device 110 may be embodied as a physical computing system (e.g., a desktop computer, workstation, etc.) or virtual computing instance (e.g., executing on the cloud). The network devices 108 may be embodied as any physical networking device (e.g., a router or a switch) or virtual computing instance.

The storage device 110 may execute a distributed storage service 111 that provides the compute device 104 with remote storage I/O access to one or more storage drives 114 (e.g., solid state drives (SSDs), hard disk drives (HDDs), and the like). In particular, the compute device 104 may execute one or more workloads, such as an application 105, on behalf of users. During execution, the application 105 may send an I/O request to perform a storage I/O operation (e.g., a storage I/O read or write operation) to the storage service 111. In turn, the storage service 111 performs the requested operation at one of the storage drives 114 and returns an acknowledgement to the application 105. Further, the network devices 108 interconnect the compute device 104 with the storage device 110. As a result, traffic (e.g., I/O requests and acknowledgements) between the compute device 104 and the storage device 110 may traverse one or more of the network devices 108.

Figure 2:
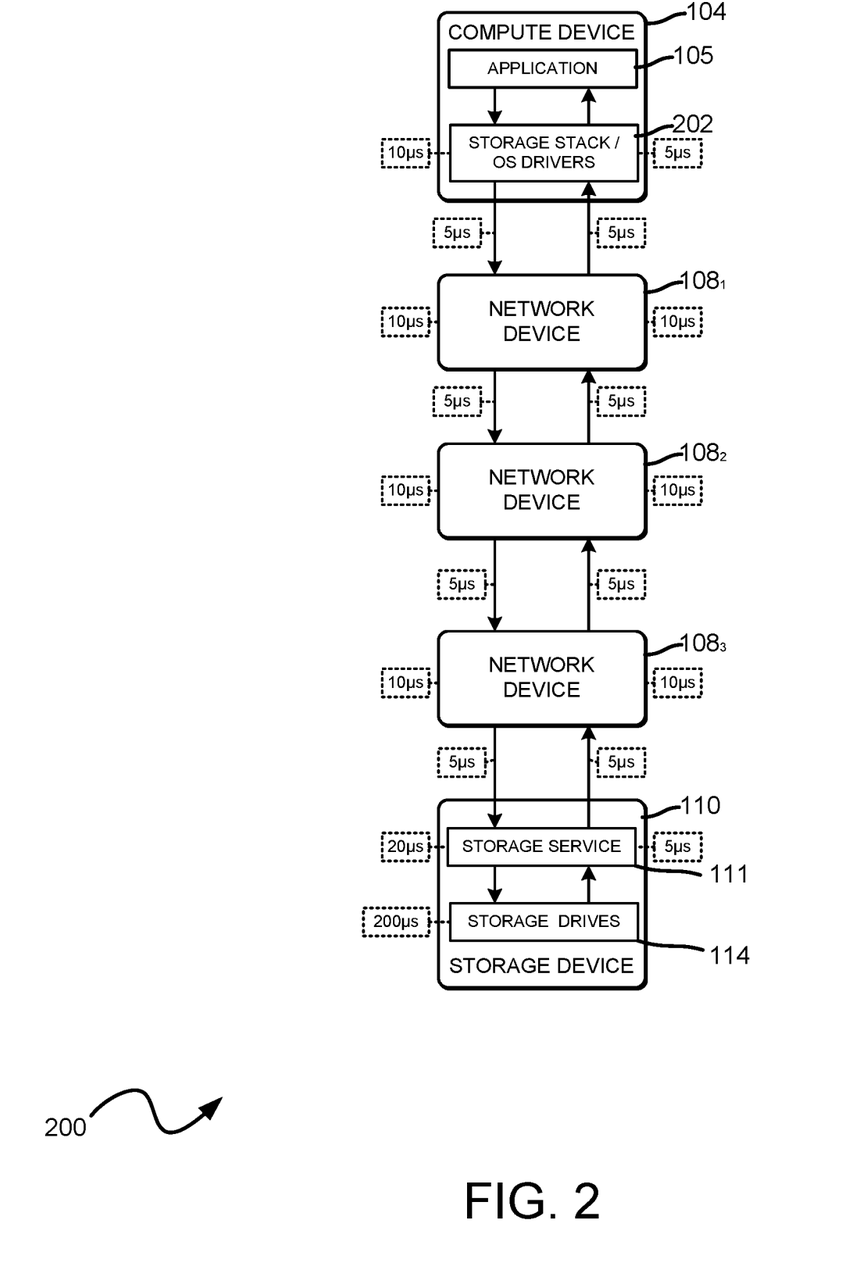
FIG. 2 is a simplified block diagram that illustrates contributors to a latency of an I/O request from end-to-end.

In the example computing environment 100, the workload may be subject to a QoS requirement with regard to I/O latency. For example, a service level agreement (SLA) may require that I/O latency stay within a given amount, such as under 500 µs per request. Typically, a resulting latency of an I/O operation is influenced by a number of contributors. For example, referring now to FIG. 2, a block diagram illustrating such contributors to latency in an I/O operation in the cloud provider network 102 is shown. Illustratively, FIG. 2 depicts an I/O path having processing stages associated with the compute device 104, network devices $108_{1-3}$, and the storage device 110. In this example, an I/O request originates from the application 105, is processed at a storage software stack/operating system (OS) drivers 202 of the compute device, traverses each of the network device, and arrives at the storage service 110. The storage service 110 then performs the I/O operation on the storage drives 114 and returns an acknowledgement to the application 105. As shown, at each processing stage of the path, the I/O request incurs an amount of latency. For example, the I/O request incurs 10 µs of latency at the storage stack/OS drivers 202, and the I/O request incurs 5 µs when traveling between the compute device 104 and the network device $108_1$. According to this example, a perfect read I/O path is to be completed in 340 µs.

As further described herein, embodiments disclose an end-to-end QoS deadline-aware I/O scheduler configured with each component of the cloud provider network 102 (e.g., the compute device 104, the network devices 108, storage device 110, and storage drive(s) 114). Returning to FIG. 1, each of the compute device 104, network devices 108, and storage device 110 include an I/O scheduler 106, 109, and 112 respectively. Although not shown in FIG. 1, in some embodiments, the storage drives 114 also include an I/O scheduler. The I/O scheduler is configured to include information relating to a QoS requirement (e.g., I/O latency) in an I/O request, such as in the packet header of the request. At each processing stage in a known I/O path, the component, via the respective I/O scheduler, evaluates the QoS information to determine timing characteristics, such as an actual time remaining to meet a QoS requirement, remaining time on each path to process the I/O request given ideal conditions, and a progress indicator (e.g., what stages in the I/O path have completed processing the request). Doing so allows the I/O scheduler to dynamically prioritize the I/O request based on such QoS information included with the packet. As a result, including QoS information into an I/O request packet removes the need for assigning an I/O class to a given priority level, thus ensuring that each component in the I/O path is efficiently used, whether one workload or multiple workloads are issuing I/O requests concurrently.

Note, the following refers to a computing environment that performs remote storage I/O operations as a reference example for a QoS deadline-aware I/O scheduler. However, one of skill in the art will recognize that the embodiments described herein may be adapted to various I/O operations, such as network I/O operations.

Figure 3:
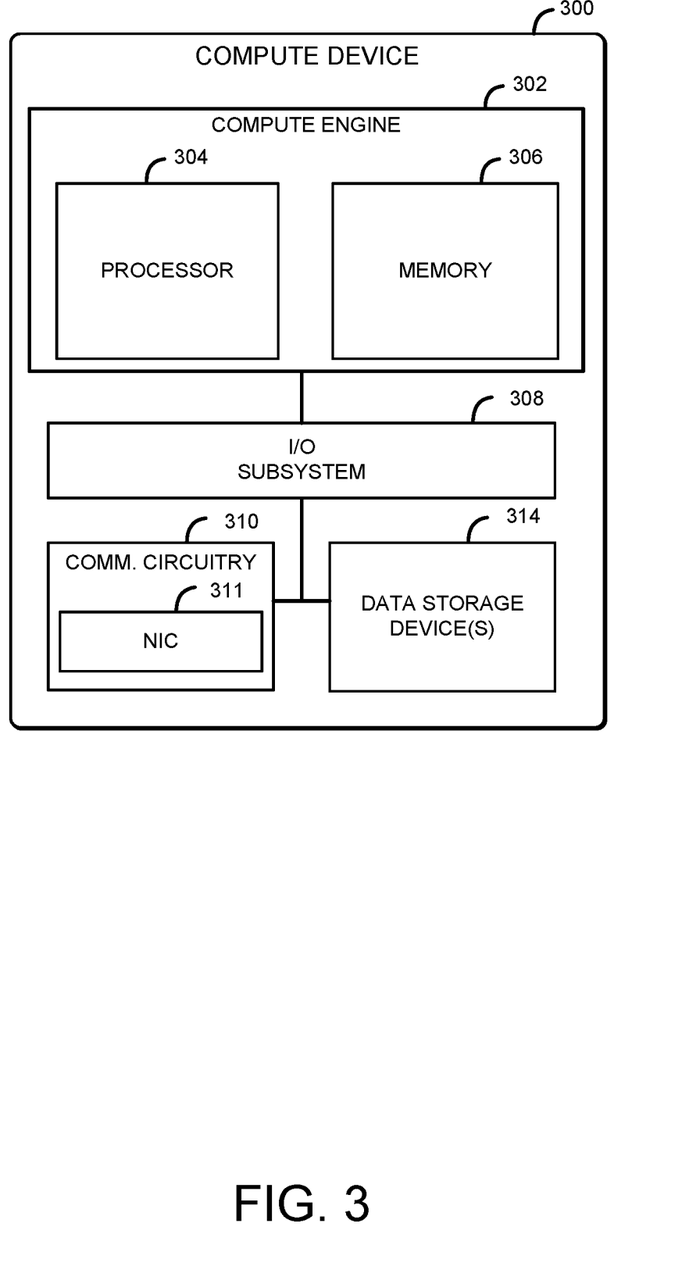
FIG. 3 is a simplified block diagram of at least one embodiment of an example compute device described relative to FIG. 1.

Referring now to FIG. 3, a compute device 300 may be embodied as any type of device capable of performing the functions described herein, including receiving, from a compute device (or other I/O path component) in an I/O path, an I/O request packet, evaluating one or more QoS deadline metadata in the I/O request packet, and assigning a priority to the I/O request packet as a function of the evaluated QoS metadata. Note, the compute device 300 may be representative of any of the compute device 104, network devices 108, and storage device 110 described relative to FIGS. 1 and 2.

As shown, the illustrative compute device 300 includes a compute engine 302, an input/output (I/O) subsystem 308, communication circuitry 310, and one or more data storage devices 314. Of course, in other embodiments, the compute device 300 may include other or additional components, such as those commonly found in a computer (e.g., display, peripheral devices, etc.), such as peripheral devices. Additionally, in some embodiments, one or more of the illustrative components may be incorporated in, or otherwise form a portion of, another component.

The compute engine 302 may be embodied as any type of device or collection of devices capable of performing various compute functions described below. In some embodiments, the compute engine 302 may be embodied as a single device such as an integrated circuit, an embedded system, a field programmable gate array (FPGA), a system-on-a-chip (SOC), or other integrated system or device. Additionally, in some embodiments, the compute engine 302 includes or is embodied as a processor 304 and a memory 306. The processor 304 may be embodied as one or more processors, each processor being a type capable of performing the functions described herein. For example, the processor 304 may be embodied as a single or multi-core processor(s), a microcontroller, or other processor or processing/controlling circuit. In some embodiments, the processor 304 may be embodied as, include, or be coupled to an FPGA, an ASIC, reconfigurable hardware or hardware circuitry, or other specialized hardware to facilitate performance of the functions described herein.

The memory 306 may be embodied as any type of volatile (e.g., dynamic random access memory, etc.) or non-volatile memory (e.g., byte addressable memory) or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 306 may be integrated into the processor 304.

The compute engine 302 is communicatively coupled with other components of the computing environment 100 via the I/O subsystem 308, which may be embodied as circuitry and/or components to facilitate input/output operations with the compute engine 302 (e.g., with the processor 304 and/or the memory 306) and other components of the compute device 300. For example, the I/O subsystem 308 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 308 may form a portion of a system-on-a-chip (SoC) and be incorporated, along with one or more of the processor 304, the memory 306, and other components of the compute device 300, into the compute engine 302.

The communication circuitry 310 may be embodied as any communication circuit, device, or collection thereof, capable of enabling communications over a network between the compute device 300 and other devices, such as component devices in a given I/O path (e.g., the compute device 104, network devices 108, storage device 110, etc.). The communication circuitry 310 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 310 includes a network interface controller (NIC) 312, which may also be referred to as a host fabric interface (HFI). The NIC 312 may be embodied as one or more add-in-boards, daughtercards, controller chips, chipsets, or other devices that may be used by the compute device 300 for network communications with remote devices. For example, the NIC 312 may be embodied as an expansion card coupled to the I/O subsystem 308 over an expansion bus such as PCI Express.

The one or more illustrative data storage devices 314 may be embodied as any type of devices configured for short-term or long-term storage of data such as, for example, memory devices and circuits, memory cards, hard disk drives (HDDs), solid-state drives (SSDs), or other data storage devices. Each data storage device 314 may include a system partition that stores data and firmware code for the data storage device 314. Each data storage device 314 may also include an operating system partition that stores data files and executables for an operating system.

Additionally or alternatively, the compute device 300 may include one or more peripheral devices. Such peripheral devices may include any type of peripheral device commonly found in a compute device such as a display, speakers, a mouse, a keyboard, and/or other input/output devices, interface devices, and/or other peripheral devices.

As described above, the cloud provider service 102 is illustratively in communication via the network 116, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 4:
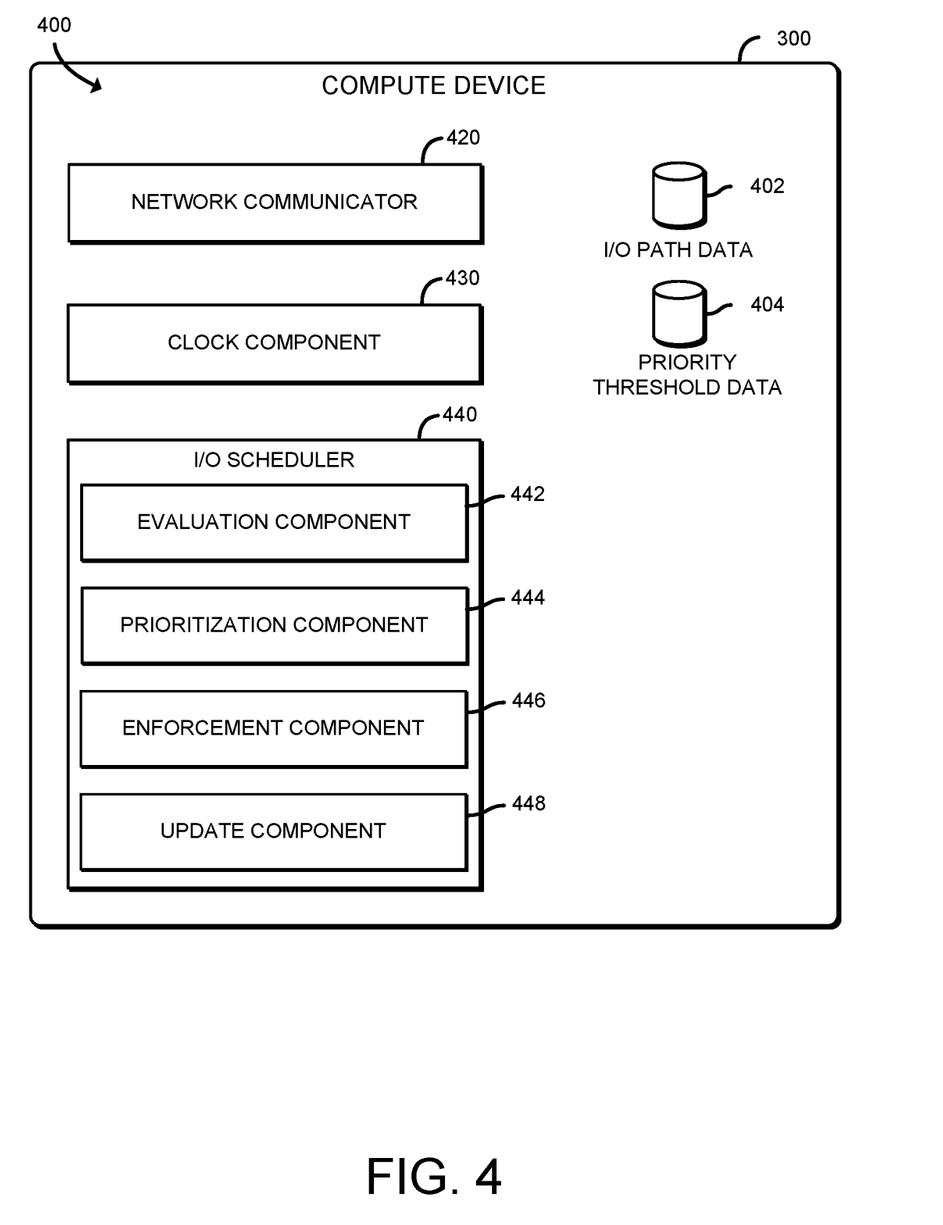
FIG. 4 is a simplified block diagram of at least one embodiment of an environment that may be established by the compute device of FIG. 3.

Referring now to FIG. 4, the compute device 300 may establish an environment 400 during operation. The illustrative environment 400 includes a network communicator 420, a clock component 430, and an I/O scheduler 440. Each of the components of the environment 400 may be embodied as hardware, firmware, software, or a combination thereof. Further, in some embodiments, one or more of the components of the environment 400 may be embodied as circuitry or a collection of electrical devices (e.g., network communicator circuitry 420, clock component circuitry 430, and an I/O scheduler circuitry 440, etc.). It should be appreciated that, in such embodiments, one or more of the network communicator circuitry 420, clock component circuitry 430, I/O scheduler circuitry 440) may form a portion of one or more of the NIC 312, compute engine 302, the communication circuitry 310, the I/O subsystem 308, and/or other components of the compute device 300.

In the illustrative embodiment, the environment 400 includes I/O path data 402, which may be embodied as any data indicative of known I/O paths of I/O components (e.g., the compute device 104, software executing in the compute device 104, network devices 108, storage device 110, storage service 111, storage drives 114, etc.). The I/O path data 402 describes one or more hop-to-hop paths that a given I/O request for a given workload traverses. The I/O path data 402 also includes ideal path latency for each path. In some embodiments, the ideal path latency may be determined by generating and collecting timestamps of one or more training I/O requests through the path. Further, the environment 400 also includes priority threshold data 404, which may be embodied as any data indicative of urgency factor thresholds corresponding to priority levels for an I/O request. As further described herein, an urgency factor is used by I/O path components to determine how to prioritize a given I/O request based on QoS deadline information. The urgency factor is mapped to one of the priority levels based on which threshold(s) in the priority threshold data 404 is/are exceeded.

The network communicator 420, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from other I/O path components. To do so, the network communicator 420 is configured to receive and process data packets from one system or computing device (e.g., the compute device 104, network devices 108, storage device 110, storage service 111, storage drives 114, etc.) and to prepare and send data packets to another computing device or system. Accordingly, in some embodiments, at least a portion of the functionality of the network communicator 420 may be performed by the communication circuitry 310, and, in the illustrative embodiment, by the NIC 312.

The clock component 430, which may be embodied as hardware, firmware, software, virtualized hardware, emulated architecture, and/or a combination thereof, is to provide time data for I/O request packets. For instance, the clock component 430 communicates with the system clock and synchronizes the time with other I/O path components using standard synchronization techniques.

The I/O scheduler 440, which may be embodied as hardware, firmware, software, virtualized hardware, emulated architecture, and/or a combination thereof, is to receive I/O request packets, evaluate QoS deadline metadata included with the I/O request packets, and dynamically assign a priority to the I/O request packets that can be enforced by the components of the I/O path to ensure that the I/O request is processed according to QoS requirements in an efficient manner. To do so, the I/O scheduler 440 includes an evaluation component 442, prioritization component 444, an enforcement component 446, and an update component 448.

The illustrative evaluation component 442 is to analyze an I/O packet received at the compute device 300 (e.g., by the network communicator 420). In some embodiments, the I/O packet includes QoS deadline metadata that is provided in each packet to be analyzed at each component. In some embodiments, QoS deadline metadata may be included in an I/O request packet, e.g., in a header of the packet. The evaluation component 442 may evaluate a specified header offset to identify the QoS deadline metadata. The QoS deadline metadata includes information relating to computing real-time and expected latency information for a given request, such that a prioritization can be applied to meet latency requirements for a QoS.

Figure 5:
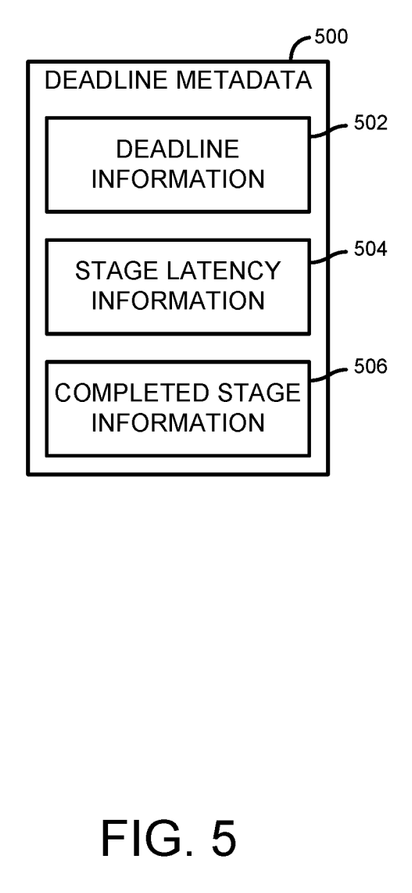
FIG. 5 is a simplified block diagram of at least one embodiment of QoS metadata that may be embedded in an I/O request packet on the compute device of FIG. 3.

For example, referring now to FIG. 5, a diagram of example QoS deadline metadata 500 is shown. As shown, the deadline metadata 500 can include deadline information 502, stage latency information 504, and completed stage information 506. The deadline information 502 may be embodied as any data indicative of a deadline in which an I/O request must be completed to conform to a given QoS requirement. For instance, the deadline information 502 may be expressed in absolute time for an entire end-to-end I/O flow (e.g., year/month/date/hour/minute/second/millisecond and so on). The stage latency information 504 may be embodied as any data indicative of a description of a sequence of stages in the I/O path (e.g., given an ideal I/O path) and the corresponding expected latency contribution at each stage under ideal conditions. The completed stage information 506 may be embodied as any data indicative of which stages in the I/O path are complete. For example, the completed stage information 506 may be embodied as a bitmap in which completed stages are assigned a given bit and incomplete stages are assigned another bit.

Returning to FIG. 4, the evaluation component 442 may determine, from the QoS deadline metadata (e.g., from the deadline information 502), an actual time to deadline measure for the I/O request as the request is received by the compute device 300 in real-time. The actual time to deadline is relative to the synchronized clocks of each device in the I/O path. The evaluation component 442 further determines (e.g., from the stage latency information 504 and the completed stage information 506) a remaining time on the I/O path based on the latencies (e.g., given an ideal situation) associated with the incomplete stages of the I/O path.

In some embodiments, the evaluation component 442 may generate an urgency factor from the determined actual time to deadline and remaining time on I/O path measures. For example, the urgency factor may be calculated as:

$$\text{urgency\_factor} = (\text{time\_to\_deadline} - \text{ideal\_path\_TODO\_left}) / \text{time\_to\_deadline} \quad (1),$$

where time_do_deadline is the actual time to deadline and ideal_path_TODO_left is the remaining time on the I/O path measures.

The illustrative prioritization component 444 is to evaluate the generated urgency factor relative to the priority threshold data 404. As stated, the priority threshold data 404 may indicate a priority level based on threshold(s) that the urgency factor exceeds. Once evaluated, the prioritization component 444 may assign a priority level to the I/O request. The illustrative enforcement component 446 is to evaluate the priority level assigned to the I/O request and place the I/O request in a queue of I/O requests to be processed or forward. The position of the I/O request in the queue is based on the priority level of the I/O request relative to priority levels of other requests to be served. Doing so ensures that, if a given I/O request has higher priority, the compute device 300 services the request to meet QoS requirements.

The illustrative update component 448 is to modify the QoS deadline metadata in I/O request packet prior to forwarding the I/O request packet to the next stage in the I/O path. For example, the update component 448 may modify the completed stage information 506 to indicate that the present processing stage at the compute device 300 is complete. The update component 448 may direct the network communicator 420 to forward the updated I/O request packet to the next component in the I/O path.

It should be appreciated that each of the network communicator 420, clock component 430, and I/O scheduler 440 may be separately embodied as hardware, firmware, software, virtualized hardware, emulated architecture, and/or a combination thereof. For example, the network communicator 420 and clock component 430 may be embodied as hardware components, while the I/O scheduler 440 is embodied as virtualized hardware components or as some other combination of hardware, firmware, software, virtualized hardware, emulated architecture, and/or a combination thereof.

Figure 6:
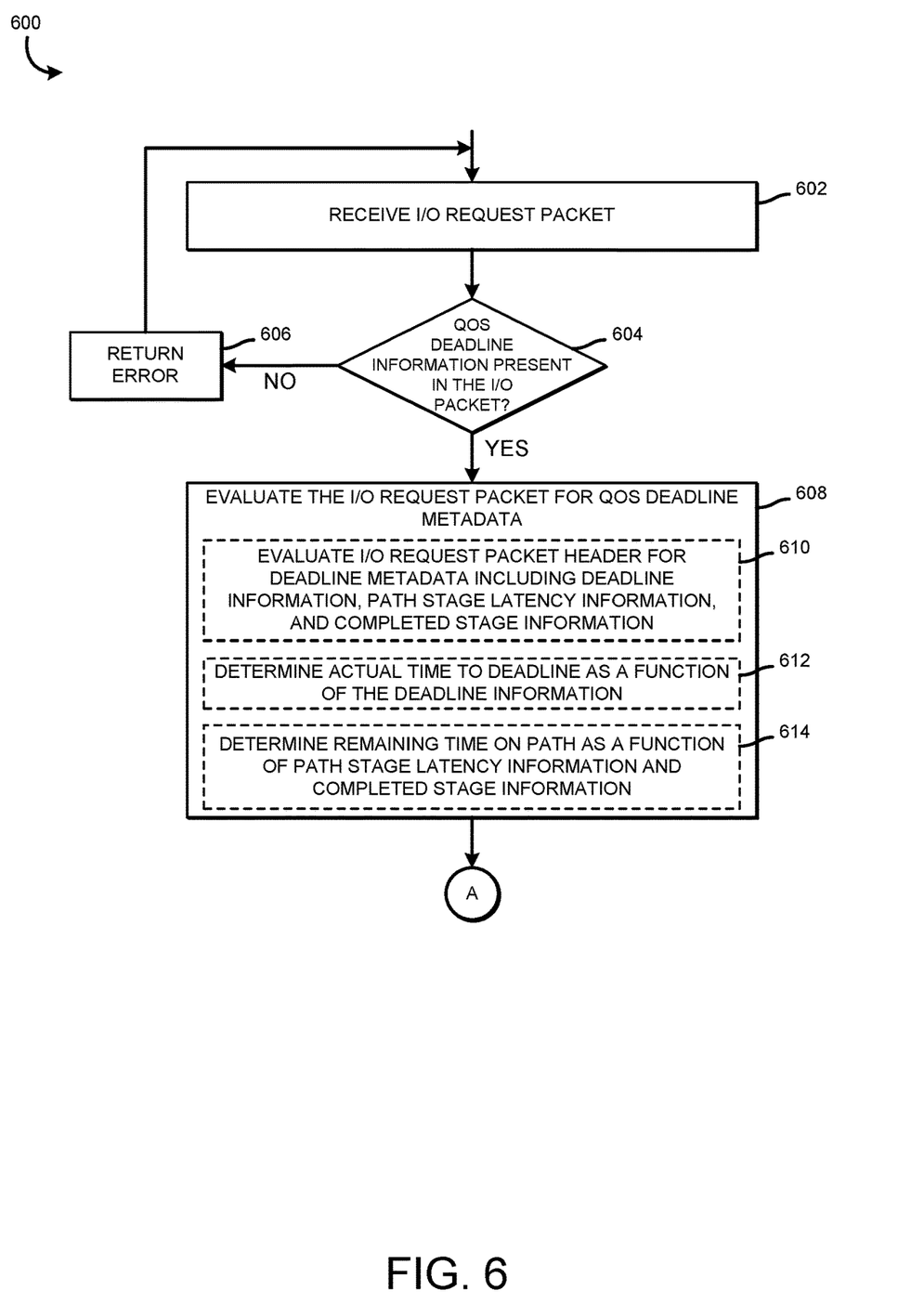
FIGS. 6 and 7 are simplified flow diagrams of a method for processing an I/O request packet that is subject to QoS requirements.
Figure 7:
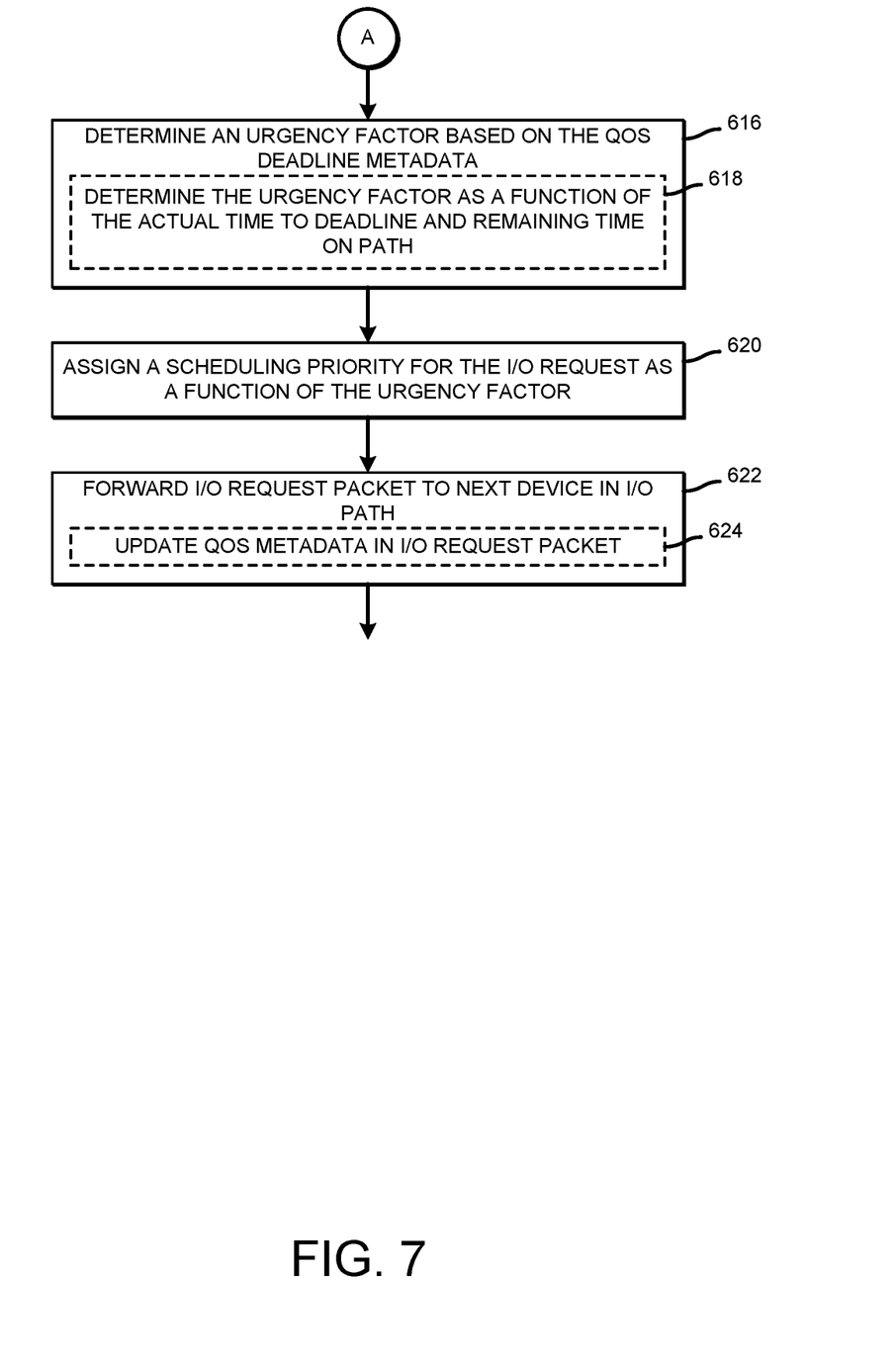

Referring now to FIGS. 6 and 7, the compute device 300, in operation, performs a method 600 for processing an I/O request packet that is subject to QoS requirements. The method 600 may be performed by any component in an I/O path from an application workload to an I/O service, such as compute device 300.

As shown, the method 600 begins in block 602, in which the compute device 300 receives an I/O request packet. For example, the I/O request packet may be representative of a request to a distributed storage service by a workload to perform a storage I/O read operation. The read operation itself may be subject to some QoS latency requirement. In block 604, the compute device 300 determines whether QoS deadline metadata is present in the I/O request packet. If not, then in block 606, the compute device 300 returns an error.

Otherwise, the compute device 300 evaluates the I/O request packet for the QoS deadline metadata, as indicated in block 608. For instance, to do so, in block 610, the compute device 300 evaluates the I/O request packet header for deadline metadata including deadline information, path stage latency information, and the completed stage information. In block 612, the compute device 300 determines the actual time to the deadline as a function of the deadline information. To do so, the compute device 300 retrieves the absolute time deadline from the QoS deadline metadata and calculates the time to deadline from the timestamp indicating when the I/O packet was received by the compute device 300. In block 614, the compute device 300 determines the remaining time on the I/O path as a function of the path stage latency information, and completed stage information. In particular, the compute device 300 may identify incomplete processing stages based on the QoS metadata and calculate, based on the expected latencies of those stages (as specified in the QoS metadata), the remaining time at which to complete the I/O request at which the QoS requirements can be satisfied.

Turning to FIG. 7, in block 616, the compute device 300 determines an urgency factor based on the QoS deadline metadata. More particularly, in block 618, the compute device 300 determines the urgency factor as a function of the actual time to deadline and the remaining time on path. As stated, the urgency factor is used to determine how the I/O request should be prioritized relative to other existing I/O requests arriving at the compute device 300. In block 620, the compute device 300 assigns a scheduling priority for the I/O request as a function of the determined urgency factor. For example, to do so, the compute device 300 may evaluate the urgency factor against one or more thresholds that are mapped to corresponding priority levels. In some embodiments, the compute device 330 may assign the I/O request to a given priority level based on which thresholds the urgency exceeds.

In block 622, the compute device 300 forwards the I/O request packet to the next device in the I/O path. The I/O request packet includes updated metadata that indicates that the processing stage at the compute device 300 is completed. To do so, in block 624, the compute device 300 updates the QoS metadata in the I/O request packet. For instance, the compute device 300 may modify a bit of a bitmap representing the completed stages.

Figure 8:
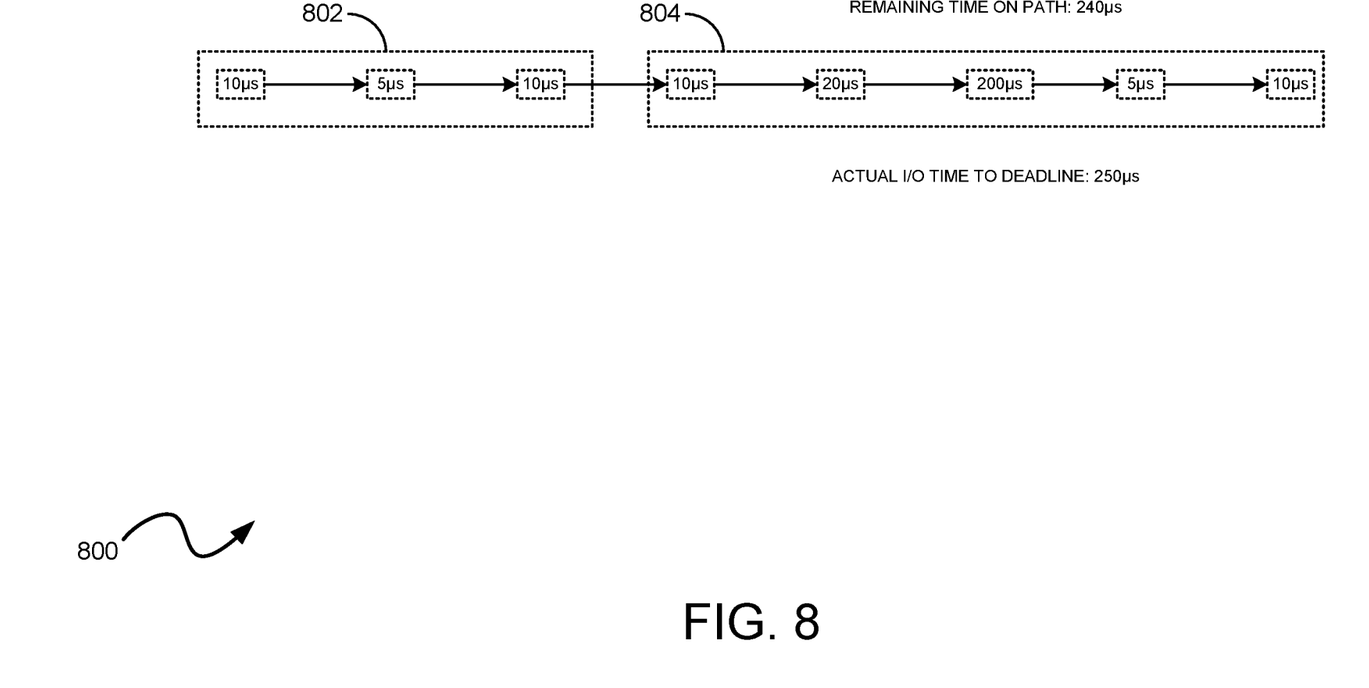
FIG. 8 is a simplified flow diagram depicting latency at each stage of an I/O path for an example I/O request.

Referring now to FIG. 8, a diagram of an example 300 of an I/O path progression that can be identified by an I/O path component (e.g., the compute device 300) is depicted. As shown, each stage is depicted in terms of an associated latency. The path and associated latencies in each stage may be expressed in the QoS metadata, e.g., as stage latency information 504. Illustratively, stages 802 are indicative of processing stages in the I/O path that are complete. Such information may be indicated in the QoS metadata, e.g., as completed stage information 506. Further, stages 804 are indicative of stages that are incomplete at arrival of the I/O request packet to the current I/O path component.

The compute device 300 may derive the actual time to deadline and remaining time on path based on the information provided by the QoS metadata. For instance, evaluating the deadline information and clock data, the compute device 300 may determine that the actual time to deadline is 250 µs. Further, by evaluating expected latency information associated with the stages 804, the compute device 300 can determine that the remaining time on path is 240 µs. Doing so allows the compute device 300 to derive an urgency factor of 0.04, which can then be used to determine a priority level for the I/O request.

EXAMPLES

Illustrative examples of the technologies disclosed herein are provided below. An embodiment of the technologies may include any one or more, and any combination of, the examples described below.

Example 1 includes a compute device comprising a communication circuitry; and a compute engine to receive, by the communication circuitry and from one of a plurality of compute devices in an I/O path, an I/O request packet, wherein the I/O request packet includes one or more Quality-of-Service (QoS) deadline metadata, wherein the QoS deadline metadata is indicative of latency information relating to a workload relative to a specified QoS; evaluate the one or more QoS deadline metadata; and assign a priority to the I/O request packet as a function of the evaluated QoS metadata.

Example 2 includes the subject matter of Example 1, and wherein to evaluate the one or more QoS deadline metadata comprises to evaluate a header in the I/O request packet for the QoS deadline metadata.

Example 3 includes the subject matter of any of Examples 1 and 2, and wherein to evaluate the one or more QoS deadline metadata comprises to evaluate a QoS deadline, latency information for each of a plurality of stages in the I/O path, and information indicative of which of the plurality of stages in the I/O path are complete.

Example 4 includes the subject matter of any of Examples 1-3, and wherein to evaluate the one or more QoS deadline metadata further comprises to determine, as a function of the QoS deadline, an actual time to deadline; and determine a remaining time on the I/O path as a function of the actual time to deadline, the latency information, and the information indicative of which of the plurality of stages in the I/O path are complete.

Example 5 includes the subject matter of any of Examples 1-4, and wherein the compute engine is further to determine an urgency factor as a function of the actual time to deadline and the remaining time on the I/O path.

Example 6 includes the subject matter of any of Examples 1-5, and wherein to assign the priority to the I/O request packet comprises to evaluate the urgency factor relative to one or more thresholds each corresponding with a priority level.

Example 7 includes the subject matter of example 6, wherein the compute engine is further to update the information indicative of which of the plurality of stages in the I/O path are complete; and forward the I/O request packet to a next one of the compute devices in the I/O path;

Example 8 includes the subject matter of any of Examples 1-7, and wherein to receive the I/O request packet comprises to receive one of a storage I/O request packet or a network I/O request packet.

Example 9 includes the subject matter of any of Examples 1-8, and wherein the compute engine is further to enforce the assigned priority of the I/O request packet.

Example 10 includes one or more machine-readable storage media storing a plurality of instructions, which, when executed on a compute device, causes the compute device to receive, from one of a plurality of compute devices in an I/O path, an I/O request packet, wherein the I/O request packet includes one or more Quality-of-Service (QoS) deadline metadata, wherein the QoS deadline metadata is indicative of latency information relating to a workload relative to a specified QoS; evaluate the one or more QoS deadline metadata; and assign a priority to the I/O request packet as a function of the evaluated QoS metadata.

Example 11 includes the subject matter of Example 10, and wherein to evaluate the one or more QoS deadline metadata comprises to evaluate a header in the I/O request packet for the QoS deadline metadata.

Example 12 includes the subject matter of any of Examples 10 and 11, and wherein to evaluate the one or more QoS deadline metadata comprises to evaluate a QoS deadline, latency information for each of a plurality of stages in the I/O path, and information indicative of which of the plurality of stages in the I/O path are complete.

Example 13 includes the subject matter of any of Examples 10-12, and wherein to evaluate the one or more QoS deadline metadata further comprises to determine, as a function of the QoS deadline, an actual time to deadline; and determine a remaining time on the I/O path as a function of the actual time to deadline, the latency information, and the information indicative of which of the plurality of stages in the I/O path are complete.

Example 14 includes the subject matter of any of Examples 10-13, and wherein the plurality of instructions further causes the compute device to determine an urgency factor as a function of the actual time to deadline and the remaining time on the I/O path.

Example 15 includes the subject matter of any of Examples 10-14, and wherein to assign the priority to the I/O request packet comprises to evaluate the urgency factor relative to one or more thresholds each corresponding with a priority level.

Example 16 includes the subject matter of example 15, wherein the plurality of instructions further causes the compute device to update the information indicative of which of the plurality of stages in the I/O path are complete; and forward the I/O request packet to a next one of the compute devices in the I/O path;

Example 17 includes the subject matter of any of Examples 10-16, and wherein to receive the I/O request packet is to receive one of a storage I/O request packet or a network I/O request packet.

Example 18 includes the subject matter of any of Examples 10-17, and wherein the plurality of instructions further causes the compute device to enforce the assigned priority of the I/O request packet.

Example 19 includes a method, comprising receiving, from one of a plurality of compute devices in an I/O path, an I/O request packet, wherein the I/O request packet includes one or more Quality-of-Service (QoS) deadline metadata, wherein the QoS deadline metadata is indicative of latency information relating to a currently executing workload relative to a specified QoS; evaluating the one or more QoS deadline metadata; and assigning a priority to the I/O request packet as a function of the evaluated QoS metadata.

Example 20 includes the subject matter of Example 19, and wherein evaluating the one or more QoS deadline metadata comprises evaluating a header in the I/O request packet for the QoS deadline metadata.

Example 21 includes the subject matter of any of Examples 19 and 20, and wherein evaluating the one or more QoS deadline metadata comprises evaluating a QoS deadline, latency information for each of a plurality of stages in the I/O path, and information indicative of which of the plurality of stages in the I/O path are complete.

Example 22 includes the subject matter of any of Examples 19-21, and wherein evaluating the one or more QoS deadline metadata further comprises determining, as a function of the QoS deadline, an actual time to deadline; and determining a remaining time on the I/O path as a function of the actual time to deadline, the latency information, and the information indicative of which of the plurality of stages in the I/O path are complete.

Example 23 includes the subject matter of any of Examples 19-22, and further including determining an urgency factor as a function of the actual time to deadline and the remaining time on the I/O path.

Example 24 includes a compute device comprising circuitry for receiving, from one of a plurality of compute devices in an I/O path, an I/O request packet, wherein the I/O request packet includes one or more Quality-of-Service (QoS) deadline metadata, wherein the QoS deadline metadata is indicative of latency information relating to a workload relative to a specified QoS; means for evaluating the one or more QoS deadline metadata; and means for assigning a priority to the I/O request packet as a function of the evaluated QoS metadata.

Example 25 includes the subject matter of Example 24, and wherein the means for evaluating the one or more QoS deadline metadata comprises means for evaluating a header in the I/O request packet for the QoS deadline metadata; and means for evaluating, in the header, a QoS deadline, latency information for each of a plurality of stages in the I/O path, and information indicative of which of the plurality of stages in the I/O path are complete.

The invention claimed is:

1. A system comprising:
  a communication circuitry; and
  a compute engine to:
    receive, by the communication circuitry and from one of a plurality of devices in an I/O path, an I/O request packet, wherein the I/O request packet includes one or more Quality-of-Service (QoS) deadline metadata, wherein the one or more QoS deadline metadata are indicative of latency information relating to a workload relative to a specified QoS;
    evaluate the one or more QoS deadline metadata;
    determine an urgency factor as a function of an actual time to deadline and remaining time on the I/O path based on the one or more QoS deadline metadata, wherein the urgency factor is indicative of a value to compare against each of a plurality of threshold values each corresponding to a priority level; and
    assign a priority to the I/O request packet as a function of the urgency factor relative to each of the plurality of threshold values.

2. The system of claim 1, wherein to evaluate the one or more QoS deadline metadata comprises to:
  evaluate a header in the I/O request packet for the one or more QoS deadline metadata.

3. The system of claim 1, wherein to evaluate the one or more QoS deadline metadata comprises to:
  evaluate a QoS deadline, latency information for each of a plurality of stages in the I/O path, and information indicative of which of the plurality of stages in the I/O path are complete.

4. The system of claim 3, wherein to evaluate the one or more QoS deadline metadata further comprises to:
  determine, as a function of the QoS deadline, the actual time to deadline; and
  determine the remaining time on the I/O path as a function of the actual time to deadline, the latency information, and the information indicative of which of the plurality of stages in the I/O path are complete.

5. The system of claim 3, wherein the compute engine is further to:

update the information indicative of which of the plurality of stages in the I/O path are complete; and forward the I/O request packet to a next one of the plurality of devices in the I/O path.

6. The system of claim 1, wherein to receive the I/O request packet comprises to receive one of a storage I/O request packet or a network I/O request packet.

7. The system of claim 1, wherein the compute engine is further to:

enforce the assigned priority of the I/O request packet.

8. The system of claim 1, wherein the system is connected with and a part of the plurality of devices in the I/O path.

9. One or more non-transitory machine-readable storage media storing a plurality of instructions, which, when executed on a system, causes the system to:

receive, from one of a plurality of devices in an I/O path, an I/O request packet, wherein the I/O request packet includes one or more Quality-of-Service (QoS) deadline metadata, wherein the one or more QoS deadline metadata are indicative of latency information relating to a workload relative to a specified QoS;

evaluate the one or more QoS deadline metadata;

determine an urgency factor as a function of an actual time to deadline and remaining time on the I/O path based on the one or more QoS deadline metadata, wherein the urgency factor is indicative of a value to compare against each of a plurality of threshold values each corresponding to a priority level; and assign a priority to the I/O request packet as a function of the urgency factor relative to each of the plurality of threshold values.

10. The one or more non-transitory machine-readable storage media of claim 9, wherein to evaluate the one or more QoS deadline metadata comprises to:

evaluate a QoS deadline, latency information for each of a plurality of stages in the I/O path, and information indicative of which of the plurality of stages in the I/O path are complete;

determine, as a function of the QoS deadline, an actual time to deadline; and determine a remaining time on the I/O path as a function of the actual time to deadline, the latency information, and the information indicative of which of the plurality of stages in the I/O path are complete.

11. The one or more non-transitory machine-readable storage media of claim 10, wherein the plurality of instructions further causes the system to:

update the information indicative of which of the plurality of stages in the I/O path are complete; and forward the I/O request packet to a next one of the plurality of devices in the I/O path.

12. The one or more non-transitory machine-readable storage media of claim 9, wherein to receive the I/O request packet is to receive one of a storage I/O request packet or a network I/O request packet.

13. A system comprising:

circuitry for receiving, from one of a plurality of devices in an I/O path, an I/O request packet, wherein the I/O request packet includes one or more Quality-of-Service (QoS) deadline metadata, wherein the one or more QoS deadline metadata is indicative of latency information relating to a workload relative to a specified QoS;

means for evaluating the one or more QoS deadline metadata;

means for determining an urgency factor as a function of an actual time to deadline and remaining time on the I/O path based on the one or more QoS deadline metadata, wherein the urgency factor is indicative of a value to compare against each of a plurality of threshold values each corresponding to a priority level; and means for assigning a priority to the I/O request packet as a function of the urgency factor relative to each of the plurality of threshold values.

14. The system of claim 13, wherein the means for evaluating the one or more QoS deadline metadata comprises:

means for evaluating a header in the I/O request packet for the one or more QoS deadline metadata; and means for evaluating, in the header, a QoS deadline, latency information for each of a plurality of stages in the I/O path, and information indicative of which of the plurality of stages in the I/O path are complete.

15. The system of claim 13, wherein the system is connected with and a part of the plurality of devices in the I/O path.

* * * * *